United States Patent [19]

Bauer

[11] Patent Number: 5,388,257

[45] Date of Patent: Feb. 7, 1995

[54] METHOD AND APPARATUS FOR OPERATING A COMPUTER BASED FILE SYSTEM

[75] Inventor: Eric J. Bauer, Tinton Falls, N.J.

[73] Assignee: AT&T Corp., Murray Hill, N.J.

[21] Appl. No.: 247,619

[22] Filed: May 23, 1994

Related U.S. Application Data

[63] Continuation of Ser. No. 74,690, Jun. 10, 1993, abandoned, which is a continuation of Ser. No. 735,393, Jul. 24, 1991, abandoned.

[51] Int. Cl.[6] ............................................. G06F 15/40
[52] U.S. Cl. ...................................... 395/600; 395/400; 395/425; 395/700; 364/DIG. 1; 364/282.3; 364/282.4; 364/280
[58] Field of Search ............... 395/400, 425, 600, 700

[56] References Cited

U.S. PATENT DOCUMENTS

| | | | |
|---|---|---|---|
| 4,315,310 | 2/1982 | Bayliss et al. | 364/200 |
| 4,325,120 | 4/1982 | Colley et al. | 364/200 |
| 4,654,779 | 3/1987 | Kato et al. | 395/400 |
| 4,768,150 | 8/1988 | Chang et al. | 395/700 |
| 4,780,821 | 10/1988 | Crossley | 395/650 |
| 4,823,306 | 4/1989 | Barbic et al. | 364/900 |
| 4,941,084 | 7/1990 | Terada et al. | 395/650 |
| 5,006,992 | 4/1991 | Skeirik | 364/513 |
| 5,051,947 | 9/1991 | Messenger et al. | 364/900 |
| 5,109,515 | 4/1992 | Laggis et al. | 395/725 |
| 5,182,766 | 1/1993 | Garland | 379/216 |
| 5,202,828 | 4/1993 | Vertelney et al. | 364/419 |
| 5,206,951 | 4/1993 | Khoyi et al. | 395/650 |
| 5,218,696 | 6/1993 | Baird et al. | 395/600 |
| 5,313,646 | 5/1994 | Hendricks et al. | 395/600 |

OTHER PUBLICATIONS

Peterson, "A Yellow-Pages Service for a Local-Area Network", Computer Communication Review, pp. 235-242 ACM 0-89791-245-4/88/0001/0235, 1988.

Tannenbaum, Andrew J., Computer Networks, Prentice-Hall, Inc. 1981.

*Primary Examiner*—Thomas G. Black
*Assistant Examiner*—Wayne Amsbury
*Attorney, Agent, or Firm*—John A. Caccuro

[57] ABSTRACT

A computer-based file system accesses files with search requests evoked by file identifiers that are embedded in standard operating system calls. The file identifiers can be different from the standard operating system hierarchical pathname of the file, and it can include criterion type/value pairs, multiple syntax structures, substrings of the files, database calls, and phonetic spellings.

33 Claims, 6 Drawing Sheets

310 — PATH NAME - /HOME/JQP/MEMOIRS
  with PATH DELIMITERS and FILE NAMES

315 — FILE SYSTEM TREE
  "/" — ROOT
  HOME
  JQP    BIN
  PASSWORD    MEMOIRS
  CHILDHOOD
  (LOCATED AT INO = 29 WITH GEN = 8)

330 — FILE NAME TYPES
    331 — A CONVENTIONAL "PHYSICAL" FILE NAME
        i.e., "USR" OR "BIN"
    332 — A PRESCRIBED SYNTAX
        SYNTAX 1 - i.e., "ino = $X$ , gen = $Y$ "
        SYNTAX 2 - A MORE FLEXIBLE SYNTAX
        "FIND: USER = ROOT, MODE = 644"
        SYNTAX 3 - A DATABASE QUERY
        SYNTAX 4 - A NATURAL LANGUAGE SYNTAX SELECTION CRITERIA
    333 — A FILE NAME THAT IS MATCHED USING A NON-SUBSTRING-BASED
        CRITERIA, i.e., PHONETIC MATCHING "PHONETIC = KACURRO"

FIG. 4

FIG. 6
SINGLE-OBJECT "INO = X, GEN = Y" SYNTAX

FIG. 7
MULTI-OBJECT LOOKUP CRITERIA EXAMPLE (ORG = ORGNAME)

METHOD AND APPARATUS FOR OPERATING A COMPUTER BASED FILE SYSTEM

This application is a continuation of application Ser. No. 08/74690, filed on Jun. 10, 1993, which is a continuation of application Ser. No. 07/735393, filed on Jul. 24, 1991, both abandoned.

CROSS-REFERENCE TO RELATED APPLICATION

Related subject matter is disclosed in my other application filed concurrently herewith and assigned to the same assignee hereof: U.S. patent application Ser. No. 07/735394 entitled "Method and Apparatus for Parsing Extended File Names in an Operating System", now abandoned.

1. Technical Field

The present invention relates to a computer system and, more particularly, to the accessing of a file system thereof.

2. Background of the Invention

Networks, such as local area networks (LANs), now enable personal computers (PCs) (typically referred to as clients) to share resources, such as disk storage and printers, typically located at a host or server. These types of networks are generally referred to as client-/server networks. In such client/server networks common databases required by the clients are also typically stored at the server location. To enable clients to access the various common databases usually requires the use of one or more database management systems (DBMS) at the server location. Moreover, to enable a client access to one of the common databases also requires that each client have the DBMS access software. Unfortunately, the various DBMS access software required at a client location utilizes significant memory space, is costly, and must periodically be administered or updated. Moreover, when more than one type of DBMS is required at a server location, because of the types of database utilized or because of client needs or preferences, the problem becomes more severe. Thus, there is a continuing need to improve client database access arrangements in a practical, cost-effective manner.

SUMMARY OF THE INVENTION

In accordance with one aspect of my invention, I have solved the above-described problems by treating the common databases like files and directories of the server. Then using the network file sharing facilities, already available to each client of the network, each client can remotely access the databases using the existing file access system calls. In addition to client/server network applications, my invention is utilized, more generally, to enable a user to access a computer-based file apparatus using file-access system calls.

According to my invention, a computer-based file apparatus permits a real-time user-selectable search request of previously stored data objects using file access system calls which use search criteria other than a file-name-substring matching. Search criteria includes a criterion type and a criterion value which combination is also referred to as a search criterion type/value pair. The file access system call includes a purported file name containing one or more non-file-name-substring-based search criteria. Using my non-file-name-substring-based search technique, a user can do look-up-by-key, relational look-up, phonetic spelling look-up, and find-operator look-up to locate one or more stored data objects of any database or file system of the apparatus. A user may be a person, a program or an apparatus desiring to access stored data objects. According to one feature, a key associated with each located data object is returned to the user. The search criteria may identify single-data object or multiple-data object. Another feature enables multiple-data objects to be organized in a virtual directory to facilitate subsequent data object access by the user.

HIGH LEVEL DESCRIPTION

In the following description, each item or block of each figure has a reference designation associated therewith, the first number of which refers to the figure in which that item is first located (e.g., 110 is located in FIG. 1 and step 439 is located in FIG. 4).

Figure 1:
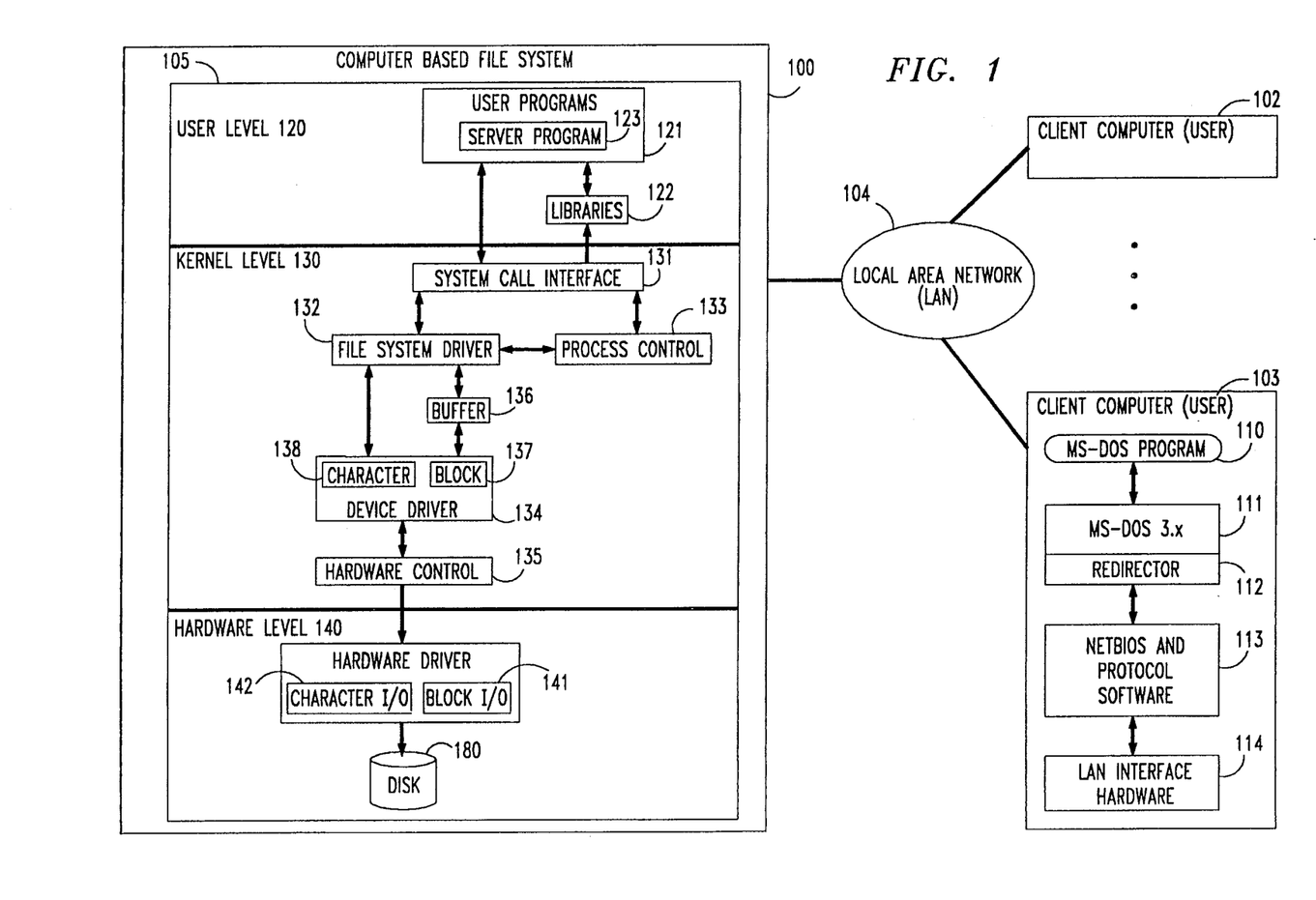
FIG. 1 is a block diagram of a client/server network including a server computer in which the present invention may be utilized.

Shown in FIG. 1 is a block diagram of an illustrative client/server system or network in which the present invention may be utilized. The network includes a server computer 100 connected to a plurality of client workstations or computers 102, 103 via a local area network (LAN) 104. Server computer 100, illustratively, provides the client computers 102, 103 shared access to data stored on hard disk 180.

In one illustrative arrangement, each of the one or more client computers 102, 103 may be a personal computer (PC) which operates using the well-known MS-DOS ® operating system or OS/2 ® operating system. (MS-DOS is a registered trademark of the Microsoft Corporation. OS/2 is a registered trademark of IBM). The LAN 104 may, illustratively, be the AT&T STAR-LAN system. The server computer 100 may, illustratively, be an AT&T 6386 WorkGroup System computer running on UNIX ® System V Release 4.0 operating system. (UNIX is a registered trademark of UNIX System Laboratories, Inc.). The client PCs 102, 103 and server computer 100 may use the AT&T Star-GROUP ™ system software. This StarGROUP system software allows MS-DOS and OS/2 client PCs to transparently share data files on a LAN.

The server computer 100 running the server program 123 on top of the UNIX operating system 120 can support one or more large hard disks (e.g., 105) that can be made available to client PCs 102 and 103 on the LAN 104.

Software on the client computer 103 interacts with the server program 123 on the server computer 100 to allow access to disk 180 by client program 110. Specifically, system calls referencing disk 180 are packaged into request messages by the redirector 112 and transmitted to the server program 123 by the network software 113 (known in the art as netbios and protocol software) over the local area network 104. The server program 123 processes the request and sends a response to the client computer 103.

A more detailed description of the operating aspects of the client/server interaction is described in the article entitled "DOS Server Program for UNIX Computers" by I. J. Heizer, published in *AT&T Technology*, Volume 4, Number One, 1989.

Server computer 100, hereinafter referred to as the computer-based file system, operates under control of a UNIX operating system 105, shown using a high-level architecture layer diagram. The layer diagram includes a user level 120, a kernel level 130, and a hardware level 140. The user level 120 interfaces to clients (hereinafter users) 102, 103 via LAN 104 enabling access to the desired file stored in disk 180.

The user level 120 includes user programs 121 (such as the server program) and libraries 122. The hardware level 140 provides the operating system 110 with basic services needed by computer 100. The kernel level 130 interacts directly with the hardware level 140 providing common services to user level 120 programs and insulating them from hardware idiosyncrasies. Viewing the system as a set of layers, the operating system is commonly called the system kernel 130, or just the kernel, emphasizing its isolation from user programs. Because user programs are independent of the underlying hardware, it is easy to move them between UNIX systems running on different hardware. The general description of the well-known operation of a UNIX operating system is derived from Chapter 2 of the book entitled "The Design of the UNIX Operating System" by Maurice J. Bach.

The system call interface 131 represents the border between user level 120 (user programs 121 and program libraries 122) and the kernel level 130. System call interface 131 converts user program calls into UNIX system calls. System calls look like ordinary function calls in C programs, and libraries map these function calls to the primitives needed to enter the operating system in a well-known manner. The set of system calls includes those that interact with the file system driver 132 and those that interact with the process control subsystems 133. The file system driver 132 manages files, allocating file space, controlling access to files, and retrieving data for users. Processes interact with the file system driver 132 via a specific set of system calls, such as open (to open a file for reading or writing), close, read, write, stat (query the attributes of a file), chown (change the record of who owns the file) and chmod (change the access permissions of a file). The file system driver 132 accesses file data using a buffer 136 that regulates data flow between the kernel and secondary storage devices. The buffering mechanism interacts with block I/O device drivers 137 to initiate data transfer to and from the kernel. Device drivers 134 are the kernel modules that control the operation of peripheral devices. Block I/O devices 141 are random access storage devices; alternatively, their device drivers 137 make them appear to be random access storage devices to the rest of the system. For example, a tape driver may allow the kernel to treat a tape unit as a random access storage device. The file system also interacts directly with "raw" or character I/O device drivers 138 without the intervention of a buffering mechanism. Raw devices, sometimes called character I/O devices 142, include all devices that are not block devices.

The process control subsystem 133 is responsible for process synchronization, interprocess communication, memory management, and process scheduling. The file system driver 132 and the process control subsystem 133 interact when loading a file into memory for execution. The process control subsystem 133 reads executable files into memory before executing them.

Some of the system calls for controlling processes include the following: fork (create a new process), exec (overlay the image of a program onto the running process), exit (finish executing a process), wait (synchronize process execution with the exit of a previously forked process), brk (control the size of memory allocated to a process), and signal (control process response to extraordinary events).

Figure 2:
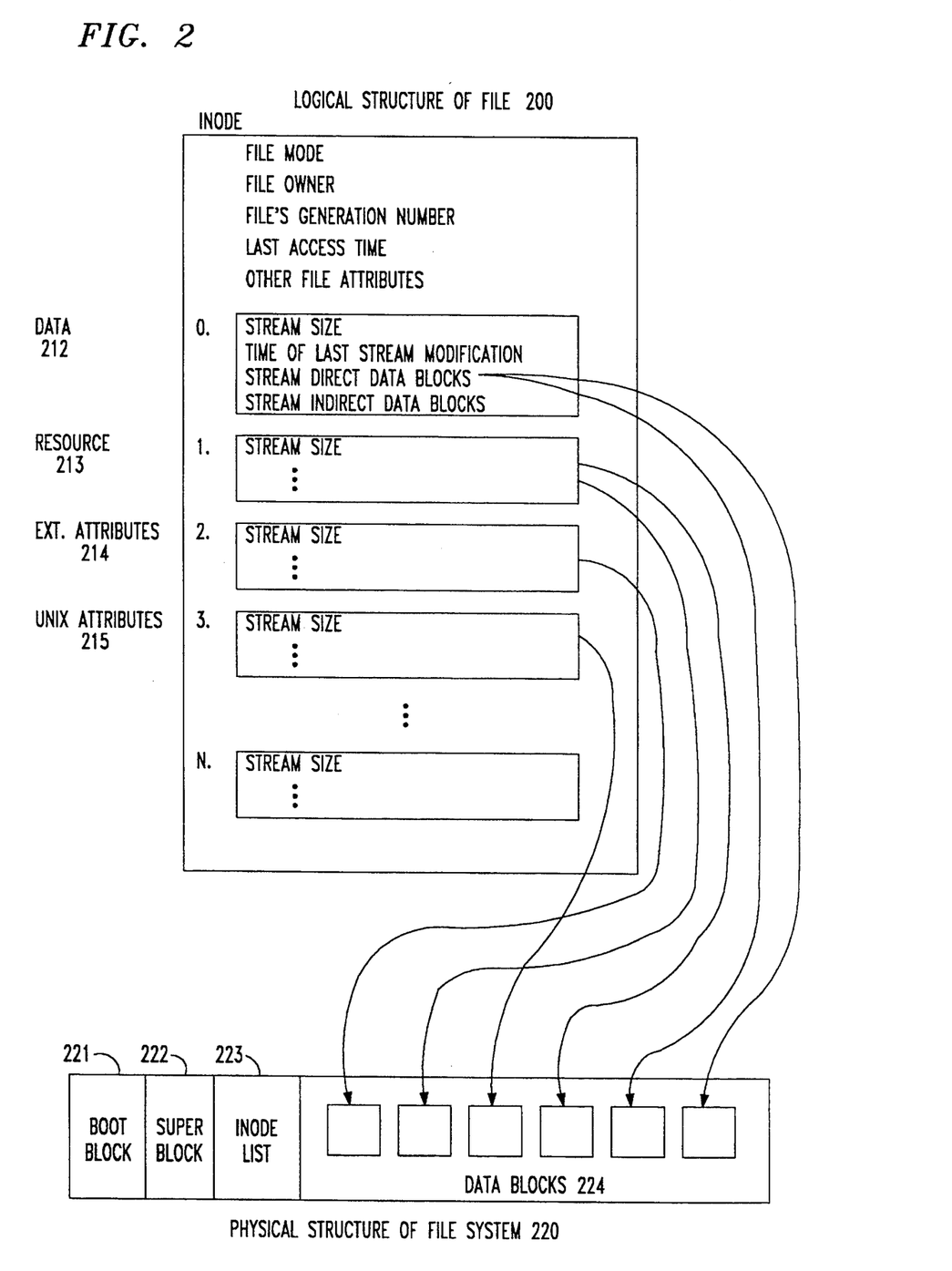
FIG. 2 shows a logical and physical structure of a file and a file system.
Figure 3:
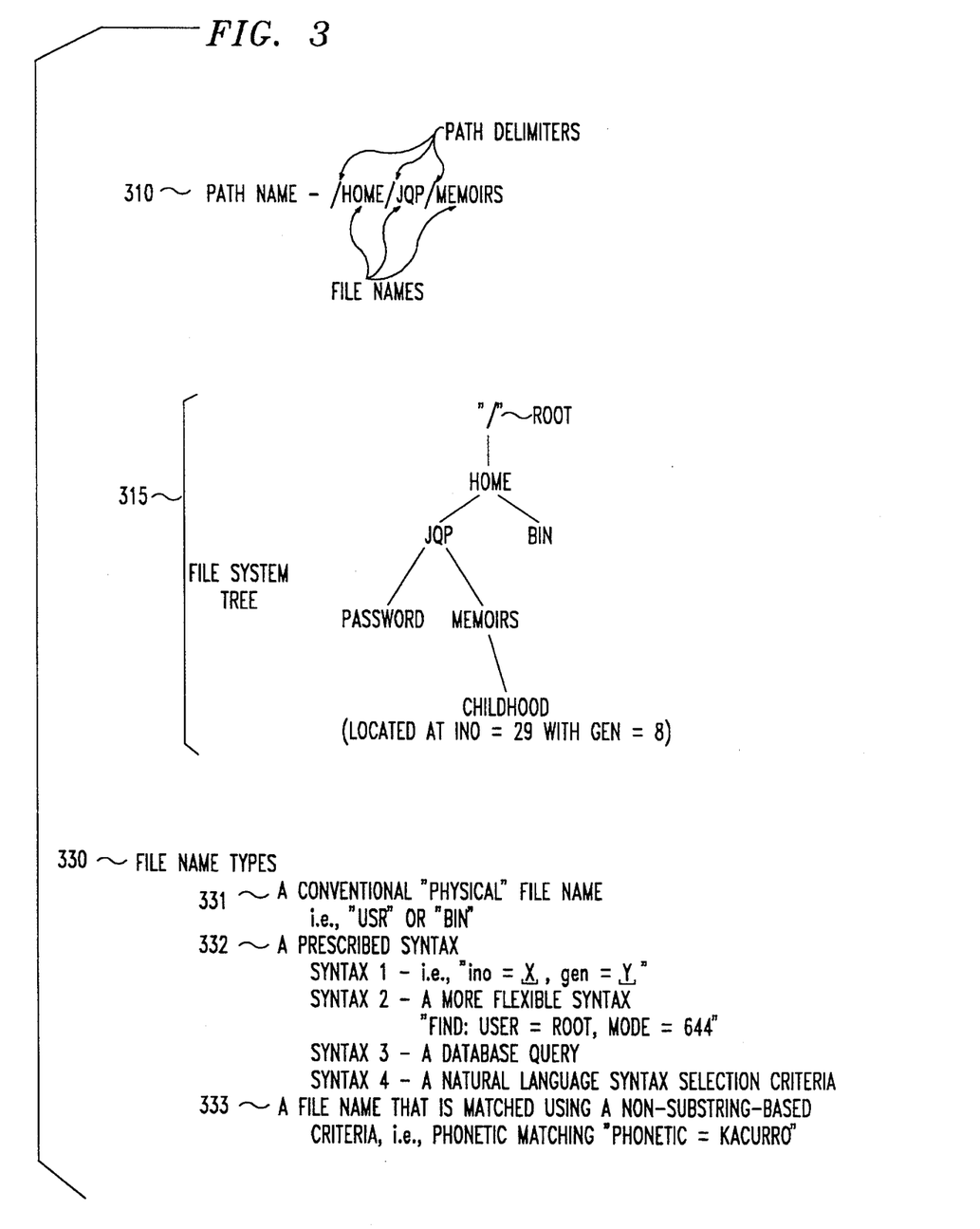
FIG. 3 defines various terms useful in describing the present invention.

With joint reference to FIGS. 1, 2 and 3 we describe an overview of a file system. Every file is named by one or more path names, 310. A path name, as shown in 310, includes file names (e.g., home) separated by delimiters (/). File names may be any of the types shown in 330. The internal representation of a file is given by an inode, 200, which contains a description of the disk layout of the file data and other information such as the file owner, access permissions, and access times. The term inode is a contraction of the term index node and is commonly used in literature on the UNIX system. Every file has one inode, but it may have several path names, all of which map into the inode. Each path name is called a link. When a process refers to a file by path name, the kernel parses the path name one file name component at a time, checks that the process has permission to search the directories in the path, and eventually retrieves the inode for the file. For example, if a process makes the call "open (/home/jqp)" the kernel retrieves the inode for "/home/jqp". As shown by 315 a "file system tree" for a full path name starts with a slash character ("/") and specifies that the path name is relative to the "root" of the file system tree. Following the branches that lead to successive component names of the path name "/home/jqp/memoirs" designates a full path name while "/jqp/memoirs" does not. A path name does not have to start from root but can be designated relative to the "current directory" of an executing process by omitting the initial slash in the path name. Thus, starting from current directory "/home", the path name "Bin" designates the file whose full path name is "/home/Bin".

When a process creates a new file, the file system driver 132 assigns it an unused inode. Inodes are stored in a section 223 of the physical file system 220, as will be described shortly, but the file system driver 132 reads them into an in-core-memory inode table when manipulating files. The UNIX system typically keeps regular files and directories on block devices such as disks. An installation may have several physical disk units each containing one or more file systems. A file system 220 is organized as a sequence of logical blocks, each containing 512, 1024, 2048, or any convenient multiple of 512 bytes, depending on the system implementation. Multiples of 512 are used by convention and there is no intrinsic reason to use 512 byte blocks.

A physical file system may have the physical structure illustrated by 220 of FIG. 2. The boot block 221 (only on some file systems) occupies the beginning of a file system, typically the first disk sector, and may contain the bootstrap code that is read into the machine to boot, or initialize the operating system. Although only one boot block 221 is needed to boot the system, every file system may have a (possibly empty) boot block. The super block 222 describes the state of a file system—how large it is, how many files it can store, where to find free space on the file system, and other information. The inode list 223 is a list of inodes that follows the super block in the file system. Administrators specify the size of the inode list 223 when configuring a file system. The file system driver 132 references inodes by index into the inode list 223. One inode is the root inode of the file system: it is the inode by which the root directory structure of the file system is accessible after execution of the mount system call. The data blocks 224 start at the end of the inode list and hold the contents of file data. An allocated data block contains the actual data of a file and can belong to one and only one file in the file system.

The operation of the present invention will be described as utilized in an Enhanced File System (EFS) implemented on a UNIX system using a virtual file system. Some UNIX systems use a Virtual File System (VFS) concept to organize all file system operations. Although the present invention does not require a VFS mechanism, VFS provides a convenient conceptual model to explain the invention. VFS is a merge of the System V File System Switch (FSS) and the SUN OS VFS mechanism. It is important to note that user programs will be unaffected by the SVR4.0 VFS architecture.

VFS provides a file system type independent interface to programs and users while allowing each particular file system to process file system operations in their own manner. File system type dependent kernel routines do the work specific to the type.

A key strength of VFS is that it allows new file system types to be defined and implemented by third-party software houses. The set of kernel interfaces that constitute VFS are available in a VFS file system type writers' guide available from USL.

GENERAL DESCRIPTION

The present invention permits a programmatic or human user of the file system (hereinafter collectively referred to as a user) to access files by purported (requested) file names that are completely unrelated to the actual name of the file stored in the directory structure. The purported file name is first tested for an exact match against the file names of existing files. If an exact match is not found, then EFS attempts to parse (or divide) the purported name using a logical syntax (described later). If the purported file name correctly matches one of the logical syntaxes (called back-door syntax), then EFS returns either the file that matches the logical criteria specified via the back-door syntax, or returns a virtual directory containing the files that match the logical criteria. An example "back-door" syntax is combining one or more appended segments to a base name, as described in the previously-referenced U.S. patent application Ser. No. 07/735394.

According to another feature of the present invention, there may be many types of exotic look-up criteria. Each search criteria includes a criteria type (e.g., "phonetic" of 333 in FIG. 3) and a criteria value (e.g., "Kacurro" of 333 in FIG. 3) also referred to herein as a search criteria type/value pair. As previously discussed, existing file systems support file name matching either by exact character matching of file names, or by case-insensitive matching, or by some form of substring matching (e.g., "fo?", "f*"). Henceforth, these exotic types of file name matching are referred to as "non-conventional" file name matching. Thus, in addition to conventional matching, this invention covers non-conventional look-up criteria (i.e., non-file-name-substring-based search criteria) for which the purported file name is neither an exact character, case-insensitive, nor substring of the target file name. Non-conventional look-up criteria fall into two broad categories: 1) single-object criteria that can match 0 or 1 objects; 2) multi-object criteria that can match 0, 1, or more objects. A single-object criterion may be a characteristic of the desired data object, such as a unique identifier or key to the desired data object (e.g., social security number). Conventional file name matching is a single-object criterion because the file system guarantees that a particular file name is unique within a directory. A look-up by inode number (also referred to as ino) is a single-object criterion because inodes are defined to be unique. A look-up to identify all objects on a file system owned by a particular user or to identify all files held in a particular directory is a multi-object criterion because several objects could simultaneously meet these criteria.

The single-object criterion (e.g., key) can directly reference the file object, much like the well-known "hard" or "symbolic" link mechanism (using path names) currently supported in UNIX file systems. In essence, a single-object criterion may be just another link to a file if 1 file matches the criterion, or just another file name that is not found if 0 files match the criterion. In addition to conventional file name matching, this invention permits prescribed syntaxes, such as syntax 1 in 332, to be used.

This aspect of the present invention permits a 'back-door' access to files to emulate the MACINTOSH file identifier (fileid) and directory identifier (dirid) mechanisms. MACINTOSH is a registered trademark of Apple Computer, Inc. Fileid's and dirid's are fixed-size numeric values that reference a Macintosh file or directory. These id's are more tractable than the arbitrary-length path names that are generally used to reference files or directories. The present invention permits a file or directory to be named (and hence opened, looked up, etc.) by creating a special file name based upon the value of file system parameters that are associated with a particular file. Specifically, each file on a file system can be uniquely identified by its inumber (the index into a file system table) and its generation number (a 'serial' number that is incremented each time an inumber slot in the inode list, 223, is reallocated). An algorithm permits these two numbers to be combined into or de-combined from a single number. The present invention permits a file to be accessed by using a file name of the following form: ino=decimal_inumber, gen=decimal_generation_number. This is merely one of the many non-conventional single object criteria that could be implemented via a prescribed syntax.

Figure 8:
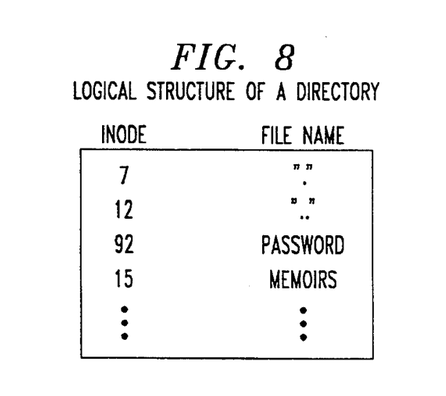
FIG. 8 illustrates a logical structure of a directory.

The typical file system model for a set of files is a directory, and thus the results of multi-object criteria look-ups are presented as files within a directory. On conventional file systems the members of a directory are the names of the files immediately subordinate to that directory. FIG. 8 illustrates the logical structure of a directory. Elements in a directory are identified by an inumber-filename pair. In addition to inumber-filename pairs for all of the files and directories immediately subordinate to the particular directory, there are entries for both "." and "..". The "." entry identifies the inumber of this particular directory, while the ".." entry identifies the inumber of this directory's immediate superior.

In the present invention, the results of a multi-object criterion look-up are returned via the get directory entry (getdents( )) system call. Each object is returned with a file name and a unique access key as the inode of the entry. Given the unique access key (e.g., inumber) of each target entry, a user can then use a single-object criterion, such as "ino=decimal_inumber," to access the target entry. In this case, the back-door syntax uses "ino=" as a prepended segment to signal that the inode number lookup search criteria should be used, and the "decimal_inumber" is a base name which gives the decimal representation of the inode key that selects the correct target entry. These directories are "virtual" in the sense that they are created on demand when a user asks to see the contents of the directory, and they are automatically removed when the user is done with it. For example, consider using this invention to implement an electronic phone book. An application issues a phonetic look-up by interrogating the directory "/phonebook/phonetic=kacurro." In this case, the back-door syntax uses "phonetic=" as a prepended segment to signal that the phonetic matching search criteria should be used, and "kaccuro" is a base name which gives the phonetic value to match against. Successive calls to the get directory entry system call might return: "caccuro,annemarie" with inumber 745; and "caccuro,john" with inumber 1124. The user would select "caccuro,john" and the application would access that entry by opening "/phonebook/ino=1124." Note that because virtual directories are being created and manipulated, an implementation could return several entries with identical file names but different inumbers, such as "smith,john."

A virtual directory is created when it is first referenced via 'VFS lookup' and persists until the kernel signals that it is no longer referenced. Typically, the kernel signals that the object is no longer referenced via the VFS 'inactive' routine. Note that the "virtual" directory "/phonebook/phonetic=kacurro" is virtual in that it will not appear if one listed the directories immediately subordinate to "phonebook".

Another aspect of this invention could permit a relational database query, 332 syntax 3, to be used to select files. For example, the 'phonebook' file system could be built to also recognize simple database queries, such as "organization=". Hence, a request to "ls/phonebook-/organization=sales" could enumerate all sales personnel. In this case, the back-door syntax uses "organization=" as a prepended segment to signal that the "organization name" field of each database record should be compared to the base name ("sales" in this example).

Another multi-object syntax type, which may be more flexible, may use a file name such as "find: user=-root, mode=644". The system would return a reference to a virtual directory containing links to all the file objects (files or directories) on the file system that matched the search criteria (owner and mode). This invention permits the single- and multi-object criteria to be computed at run-time, such as to perform "grep" operations (search for regular expressions within files). For example, a request to "ls/home/grep:AT&T" could enumerate all files subordinate to "/home" containing the string "AT&T". In this case, the back-door syntax uses "grep:" as a prepended segment to signal that the contents of the files in this directory should be searched for the base name string ("AT&T" in this example).

DETAILED DESCRIPTION

With reference to the layer diagram of FIG. 1 we now provide a more detailed operating description of the present invention.

Figure 4:
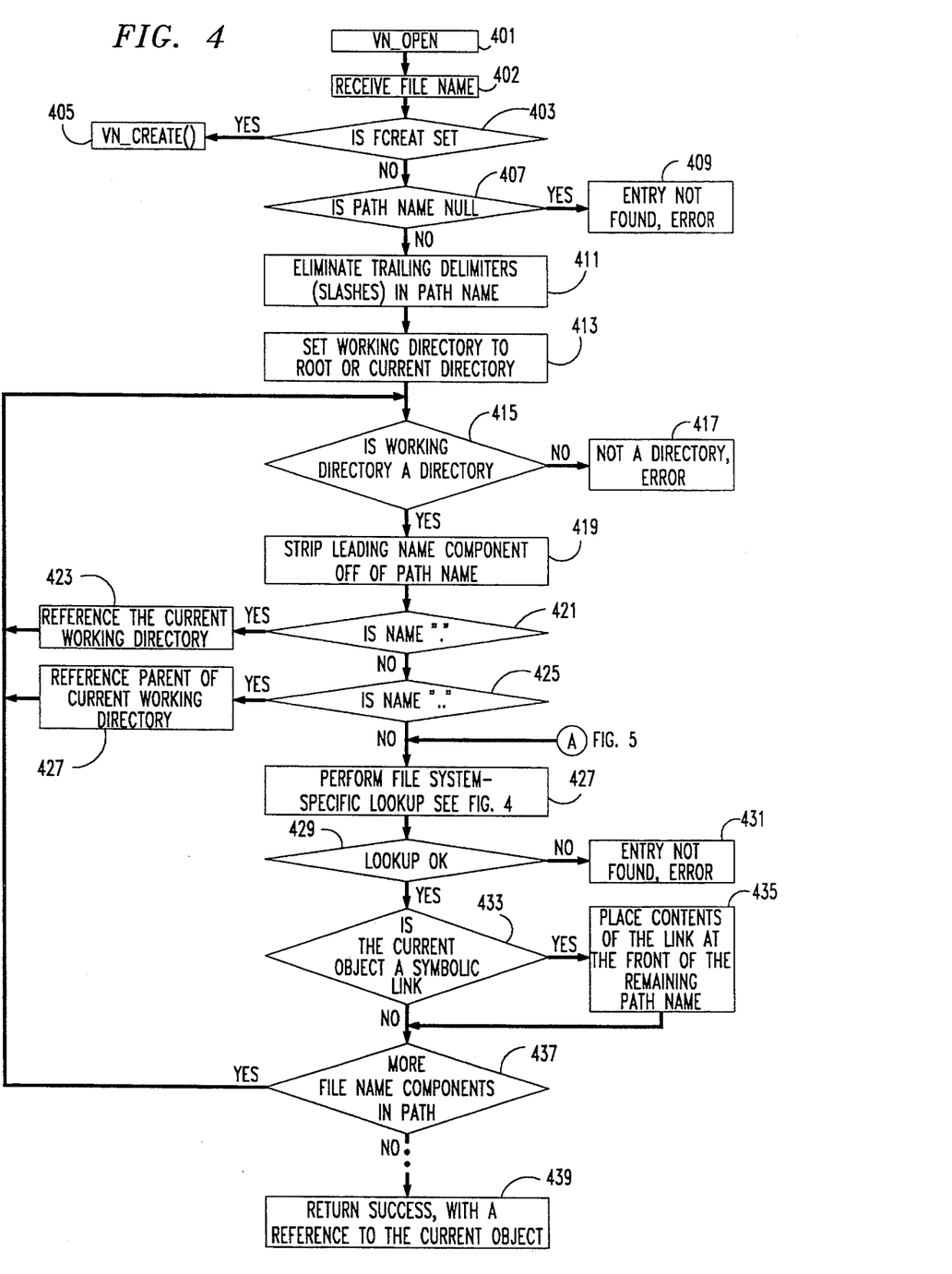
FIGS. 4 and 5 illustrate a flow chart describing various operating features of the present invention.

With joint reference to FIGS. 1 and 4 we describe the detailed operation of the present invention. The present invention is implemented to perform a file system-specific look-up feature as part of the standard look-up path name feature which occurs during a conversion of a path name to a vnode.

The initial access to a file is by its path name, as in the open, chdir (change directory), or link system calls. Because the kernal 130 works internally with vnodes rather than with path names, it converts the path names to vnodes to access files. An algorithm of the UNIX system kernel parses the path name one component at a time, converting each component into a vnode based on its name and the directory being searched, and eventually returns the vnode of the input path name.

The steps 401-425 and steps 429-439 illustrate the existing steps of the path name to vnode conversion which are briefly described so that the detailed operation of the present invention (FIG. 5) can be explained in a typical operating context.

In response to a user search request or other system request, user program 121 makes a process call (e.g., a user-program search request). When a user program 121 makes a process call, e.g., open (path name, open flag), the operating system kernel (hereinafter kernel) 130 generates the well-known command vn_open(name, seg, file mode, create mode, vpp, crwhy) in step 401. The command vn_open performs permission checks and opens a file by name, returning a pointer to the resulting vnode. In the command vn_open the parameter name contains the file name; seg is the address space the file name is in, either user space or kernel space; file mode is the open mode; create mode contains the permission bits if the file is to be created; vpp is a pointer to a vnode pointer for the result; and crwhy is the reason why this routine is called, it is defined if and only if file mode has the Fcreate bit set.

In step 402, a file name is received from a user program 121. In step 403, the kernel 130 checks if the Fcreate bit is set. If so, then in step 405 a command vn_create( ) is generated in the conventional manner. The command of vn_create indicates to the kernel 130 that the process call wishes to create a new file, an operation which is well-known and not important to an understanding of the present invention.

If the Fcreate bit is not set then in step 407 the path name is checked to determine if it is not null. In our example, recall the path name is "/home/jqp-/memoirs". If path name was a null then in step 409 an "entry not found" error is returned to the system user.

If path name is not a null then in step 411 the trailing delimiters or slashes in the path name are eliminated. (Note our example has no trailing slashes after "memoirs"). In step 413, if the first character of 'name' is a "/" character (indicating a path name starting at root), then the working directory is set to root, otherwise the working directory is set to the current directory. In step 415, it is determined whether the working directory is a directory. If not, then in step 417 a "not in directory" error is returned to the user. If working directory is a directory, then in step 419 the leading file name component (i.e., "home" in our example) is stripped off the path name.

In step 421, the stripped off file name component "home" is compared to ".". If equivalent, then in step 423 the system will reference the current working directory and then control returns to step 415. If file name component is not "." then in step 425 it is compared to "..". If equivalent to ".." then in step 427 the parent of the current working directory is referenced and control returns to step 415. Otherwise, step 427, the file system-specific look-up feature of the present invention, as illustrated in FIG. 5, is performed on the stripped-off file name "home".

Figure 5:
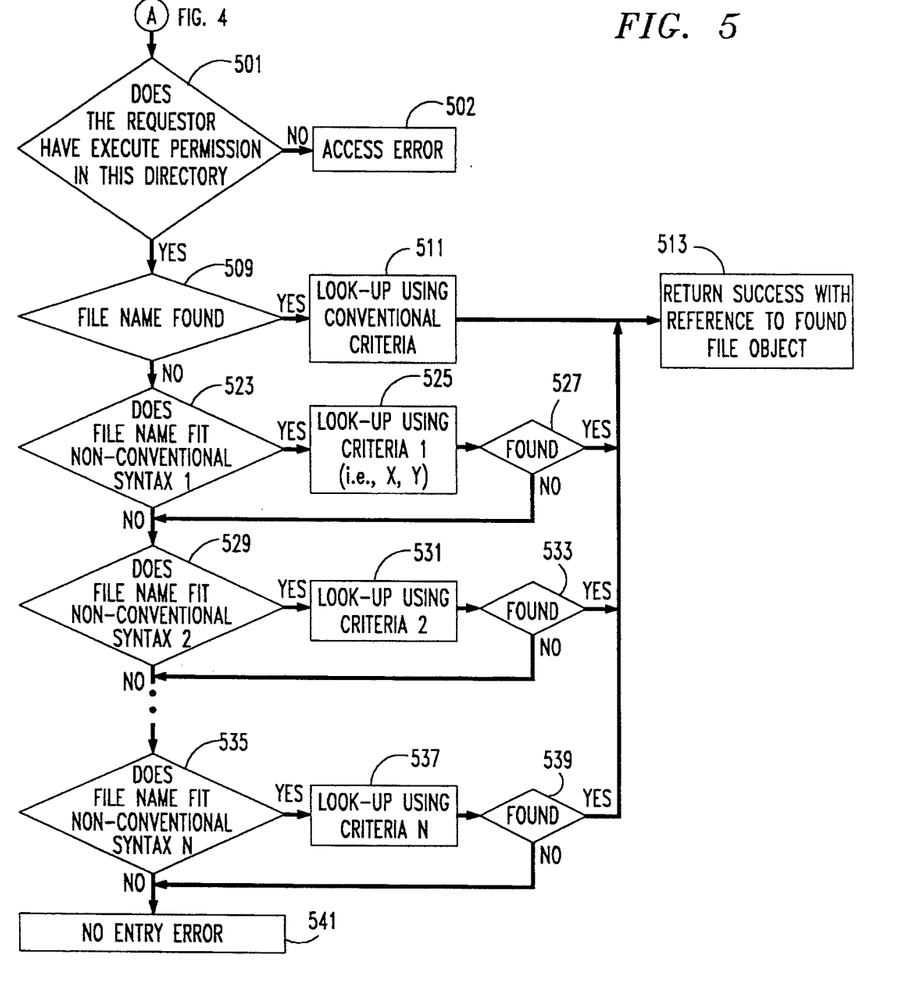

Hence, after the steps of FIG. 5 are performed on the file name "home" it returns to step 429 with a vnode reference to access the file object of the file "home". If no vnode reference was found then an error is returned to the user in step 431. Otherwise, in step 433, the system checks if the vnode reference refers to a data object which is a symbolic link. If so, then in step 435, the contents of the link are placed at the front of the remaining path name. Otherwise, in step 437 the system determines whether there are more file name components in the path name. If no more file name components then in step 439 control is returned with a vnode reference to the data object. If more file name components exist then control is returned to step 415 for further processing.

With reference to FIG. 5 we now describe the present invention, as illustratively embodied, as a file system-specific look-up feature. We describe the processing of the file name "home" of our example path name "/home/jqp/memoirs". In step 501 the requester's execute permission in the current directory is checked in the standard way. If permission does not exist an access error message is returned to the user in step 502.

If permission does exist, then in step 509 the file name "home" is processed to determine if such a file name exists in the working directory. If it does then, in step 511, the file name is looked up using conventional criteria and in step 513 a success indication is returned with a reference to the found file object.

Thus, in our example, path name "/home/jqp/memoirs" after the file name "home" is processed via steps 501, 509, 511, 513 and then by steps 429, 433 and 437. Subsequently, in step 415, 419, 421, 425 and 427 the file name "jqp" is processed. File name "jqp" is processed in the same manner as "home", i.e., by steps 501, 509, 511, 513 and then by steps 429, 433 and 437. After processing file names "home" and "jqp" the file name "memoirs" is processed in a similar manner.

Returning to step 509, assume that the user entered a purported path name that included a non-conventional file name and therefore the file name was not found via conventional means. Recall that a non-conventional file name includes one or more non-file-name-substring-based search criteria. In steps 509–541 the program attempts to locate one or more data objects using the non-file-name-based search criteria.

In step 523 the program checks whether the purported file name matches one of a group of prescribed syntaxes (in steps 523, 529 and 535). Thus, in step 523, the non-conventional file name is checked against syntax 1 (ino=X, gen=Y). If the file name does not utilize the syntax 1 format then processing advances to step 529. If a match is found, however, then in step 525, the syntax 1 criterion is used to perform the directory look-up.

Figure 6:
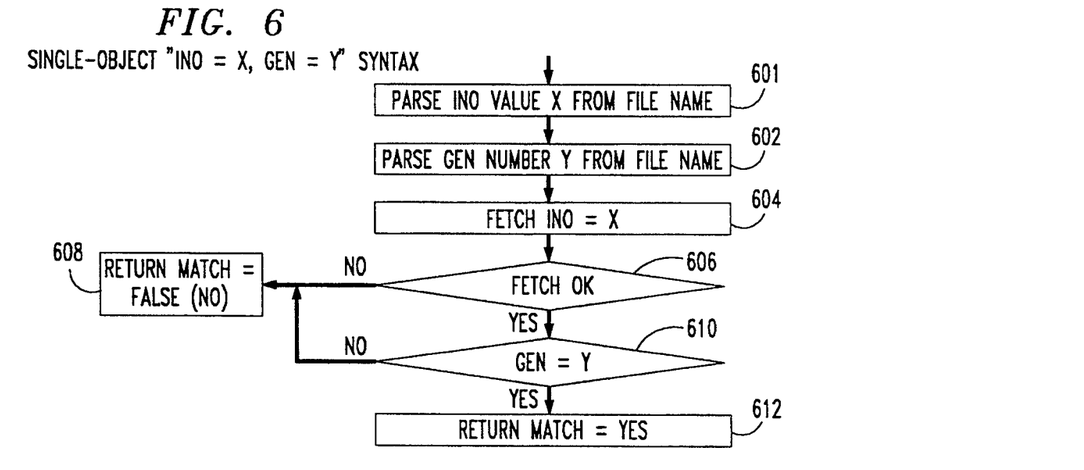
FIG. 6 shows an illustrative flow chart for implementing a single-object look-up criterion.

With reference to FIG. 6, we illustrate in more detail the typical look-up steps performed in 525. Assume that the user requests to access a file using a file name having syntax 1 format which is assumed to be "ino=X, gen=Y." Illustratively, the inode number (ino) may be viewed as a mailbox number while the generation number (gen) may be viewed as the party assigned to that mailbox number. Thus, if a mailbox is reassigned the generation number is changed but the mailbox number (or inode number) is not.

The syntax "ino=X, gen=Y" is a single-object syntax because it identifies zero or one data object (e.g., file or directory). Another single-object syntax could be, for example, a social security number.

In step 601 the system parses the inode number (ino) value X from the file name (ino=X, gen=Y). In step 602 the system parses the generation (gen) number Y from the file name. In step 604 the system accesses the inode list, 223, to fetch the file identified by inode number (ino) X. Note inode number value X refers to a vnode associated therewith. In step 606 the system determines a valid data object was fetched. If not, then in step 608 a no match or false condition is returned to step 527 of FIG. 5.

If an inode having the index value X is found on disk 180, the locate or fetch operation of step 606 is okay. In step 610, the system then checks if the generation (gen) number of the inode is Y. As previously noted, the generation number may be any number which can be used to uniquely identify a particular version of the desired data object. If the generation number of the fetched inode is not the same as Y, then control is returned to previously described step 608.

If a generation number match results from step 610, then in step 612, a "yes" or "match found" response is returned to step 527 of FIG. 5. Because this was a single-object search only, one data object on disk 180 satisfies the search criteria ino=X, gen=Y. As described in a later paragraph a key which uniquely identifies the identified data object (a physical address or maybe ino=X, gen=Y itself) may be returned on the user's display.

Returning to FIG. 5, in step 527, if a match is found using the look-up criterion of step 525, then processing continues via the previously-described steps 429, 433 and 437. If no match is found in step 527, then in step 529 the base name is checked against syntax 2 criteria. If a syntax 2 match exists in step 529, then in step 531 the syntax 2 criterion is used to check the directory.

Figure 7:
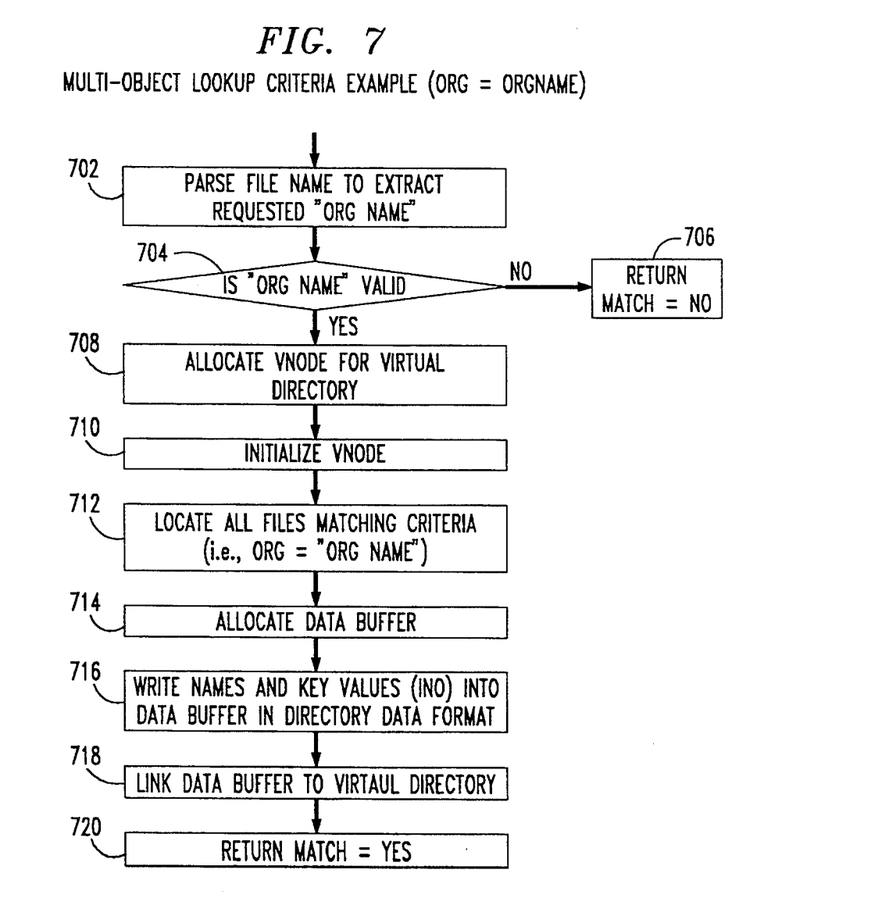
FIG. 7 shows an illustrative flow chart for implementing a multi-object look-up criterion.

With reference to FIG. 7 we describe a typical multi-object search criterion (e.g., organization name=orgname) which will serve as an illustration of syntax 2 search criteria performed in step 531.

In step 702 the file name is parsed to extract the requested organization name "orgname". In step 704 the data base or stored items are accessed to determine if "orgname" is a valid data object grouping. If not, then "no match" return is returned in step 706 (to step 535 of FIG. 5). If an "orgname" data object grouping is valid, then in step 708 a vnode is allocated for a virtual directory which will store all the data objects under the grouping "orgname". In step 710 the vnode is initialized in the normal manner. In step 712 all of the data object (or files) matching the "orgname" criterion are located. In step 714 a data buffer is allocated. In step 716 the name and key values (inode numbers, ino) are written into data buffer in directory format (as in FIG. 8). In step 718 the data buffer is linked to the virtual directory vnode. In step 720 an indication that the match was successful is returned to step 513 of FIG. 5.

Returning to FIG. 5, if no match is found, in steps 531 and 533 carried out in our FIG. 7 example, then other syntax matching steps continue up to syntax N in step 535. If a directory match is found in step 533, then in step 511 et al the success is returned along with the appropriate vnode identifier. If no syntax 2 criterion match is found, then step 535 follows in step 539. Step 535 checks whether the file name fits syntax N. If so, then steps 537 and 539 are performed in the same manner as previous steps 531, 533 otherwise step 541 is performed. Step 541 returns a "no entry" error to the user indicating that the user-provided file name could be found in the directory.

It should be recognized that the above-described sequence of doing the various conventional file name searching and non-conventional file name searching can be reversed or changed according to the particular needs of the application.

With reference to FIG. 3, we described some of the possible non-conventional file names which are shown in syntax group 332 and phonetic syntax matching 333. For example, one syntax type may use an inode number "ino" to identify a file (i.e., which item from inode list 332 of FIG. 3). Another syntax type may use "ino" in addition to a generation number "gen" which is a serial number which is incremented each time the inode is accessed. Using the additional "gen" number provides a secondary check which is useful since inode slots in a physical file system are reused it is oftentimes important to be certain that the file currently in inode slot 'Y' is the same file that was in that slot at some previous time. Generation number is a sequence number that is incremented every time an inode slot is freed. Hence, if both the number and generation numbers are the same, then this is the same file object, although the contents or attributes may, of course, have changed.

Note that this file naming scheme permits data streams to be accessed remotely using any file sharing mechanism, for example, Remote File Sharing (RFS) or Network File Sharing (NFS) mechanisms. Moreover, this scheme can be used with any future file sharing mechanism which can access files using file names.

Another application of my single-object file naming convention is to provide rapid access to file objects. For example with reference to 315 of FIG. 3, if one were trying to obtain the file "childhood" memoirs, using conventional file access techniques would require the path name "/name/jqp/memoirs/childhood". Using my invention, this "childhood" memoirs file is accessed using a path name to directly access the physical location, e.g., "/ino=29, gen=8". Depending on the configuration of a file system(s) a file name may need to be included in the path name, e.g., "/name/ino=29, gen=8".

While the present invention has been described for use in a client/server network of FIG. 1 it can also be implemented directly on the client computer. Moreover, the present invention can be utilized on-top-of a conventional physical file system (e.g., UNIX file system UFS), a data base management system (e.g., such as Informix ®), or other data storage mechanism where data can be accessed using absolute addresses. (Informix is a registered trademark of Informix Software, Inc.)

What has been described is merely illustrative of the application of the principles of the present invention. Other arrangements and methods can be implemented by those skilled in the art without departing from the spirit and scope of the present invention.

I claim:

1. A computer-based file apparatus for accessing any of a plurality of previously-stored data files, each of said data files identified by a filename, the apparatus comprising means for receiving a file identifier comprised of a string of characters as part of a standard operating system call, said file identifier being different from the standard operating system hierarchical pathname for said desired data file, said file identifier containing one or more search criterion type/value pairs, wherein each search type/value pair includes a search criterion type and a search criterion value, and means for locating one or more desired data files by matching at least one of said search criterion type/value pairs directly against a characteristic of said data files, the locating of the desired data files being performed in the absence of requiring a presorting of said data files.

2. The apparatus of claim 1 further including
    means for returning a key value and a filename associated with each located data file to the user, each key value being used by said apparatus for identifying the location of an associated data file.

3. The apparatus of claim 1 wherein said file name and said key value are returned to the user in a directory entry format.

4. The apparatus of claim 1 wherein the key value is an inode index value.

5. The apparatus of claim 1 wherein the key value includes an inode index value and a generation number.

6. The apparatus of claim 1 wherein at least one search criterion type/value pair is a phonetic spelling of a file name.

7. The apparatus of claim 1 wherein at least one search criterion type/value pair identifies two or more of said data files.

8. The apparatus of claim 1 wherein at least one search criterion value is a data substring which is to be matched against the contents of said data files.

9. The apparatus of claim 1 wherein at least one search criterion type/value pair is a file attribute value of a desired one or more data files, said file attribute value being stored in a structure of a file.

10. The apparatus of claim 1 wherein the file identifier includes a base name segment and one or more appended segments and wherein said locating means utilizes at least one of said appended segments as a search criterion type and uses said base name segment as a matching search criterion value to locate said one or more data files.

11. The apparatus of claim 10 wherein at least one of said appended segments is a suffix of said base name segment.

12. The apparatus of claim 10 wherein at least one of said appended segments is a prefix of said base name segment.

13. A client/server network including a server apparatus arranged to communicate over a facility to one or more client apparatuses, said server apparatus storing a plurality of previously-stored data files, each identified by a filename, wherein each client apparatus includes means for generating and transmitting a file identifier comprised of a string of characters as part of a standard operating system call to said server apparatus, said file identifier being different from the standard operating system hierarchical pathname for said desired data file, said file identifier containing one or more search criterion type/value pairs, each search criterion type/value pair having a search criterion type and value, each search criterion type/value pair being matched directly against a characteristic of the previously-stored data files, and said server apparatus includes a computer-based file apparatus for directly accessing any of the previously-stored data files using at least one of said search criterion type/value pairs, each search criterion type/value pair being matched directly against a characteristic of the previously stored data files, the accessing being performed in the absence of requiring presorting of said data files.

14. A computer-based file apparatus for accessing a desired data file from a group of previously-stored data files, each of said data files identified by a filename, the apparatus comprising means for receiving a file identifier comprised of a string of characters as part of a standard operating system call, said file identifier being different from the standard operating system hierarchical pathname for said desired data file, said file identifier including one or more search criterion type/value pairs, each including a search criterion type and a search criterion value, means for dividing said file identifier to obtain at least one search criterion type/value pair, and means for locating a desired data file by matching said at least one of search criterion type/value pairs directly against a characteristic of each of said data files, the locating of said desired data file being performed in the absence of requiring a presorting of said data files.

15. The apparatus of claim 14 wherein said search criterion type/value pair is an inode value.

16. The apparatus of claim 14 wherein said locating means uses two search criterion type/value pairs including an inode value in combination with a generation number of said inode value.

17. The apparatus of claim 14 wherein said search criterion type/value pair is a "fileid" file identifier of a MACINTOSH system.

18. The apparatus of claim 14 wherein said search criterion type/value pair is a "dirid" directory identifier of a MACINTOSH system.

19. A client/server network including a server apparatus arranged to communicate over a facility to one or more client apparatuses, said server apparatus storing a plurality of previously-stored data files, each identified by a filename, wherein each client apparatus includes means for generating and transmitting a file identifier comprised of a string of characters as part of a standard operating system call, said file identifier being different from the standard operating system hierarchical pathname for said desired data file, said file identifier including one or more search criterion type/value pairs, each search criterion type/value pair having a criterion type and a criterion value and, said server apparatus including means for dividing said file identifier to obtain at least one search criterion type/value pair and means for locating a desired data file by matching said at least one search criterion type/value pair directly against a characteristic of each of said data files, the locating of said desired data file being performed in the absence of requiring a presorting of said data files.

20. In a computer-based file system, a method of accessing any desired data file of a plurality of previously-stored data files stored in a memory accessible by a computer of said system, each of said data files identified by a file name, the method comprising the steps of receiving a file identifier comprised of a string of characters at said system as part of a standard operating system call, said file identifier being different from the standard operating system hierarchical pathname for said desired data file, said file identifier containing one or more search criterion type/value pair, each search criterion type/value pair having a search criterion type and value, and locating at least one desired data file, in said memory, by matching at least one of said search criterion type/value pairs directly against a characteristic of said data files, the locating of the desired at least one data files being performed in the absence of requiring a presorting of said data files.

21. The method of claim 20 further including the step of returning a key value, obtained from said memory, associated with each located data file to the user, each key value identifying the location of an associated data file.

22. The method of claim 21 wherein the returning step also returns from said memory a file name associated with said key value.

23. The method of claim 21 wherein the key value is an inode index value.

24. The method of claim 21 wherein the key value includes an inode index value and a generation number.

25. The method of claim 20 wherein at least one search criterion type/value pair is a phonetic spelling of a name.

26. The method of claim 20 wherein at least one search criterion value is a relational characteristic which exists between two or more of said data files.

27. The method of claim 20 wherein at least one search criterion value is a data substring which is to be matched against the contents of said data files.

28. The method of claim 20 wherein at least one search criterion value is a file characteristic of the desired data files.

29. In a computer-based file system, a method of accessing a desired data file from a group of previously-stored data files stored in a memory accessible by a computer of said system, each of said data files identified by a file name, the method comprising the steps of receiving a file identifier comprised of a string of characters as part of a standard operating system call, said file identifier being different from the standard operating system hierarchical pathname for said desired data file, said file identifier including one or more search criterion type/value pairs, each search criterion type/value pair including a search criterion type and a search criterion value, dividing said file identifier, by said computer, to obtain at least one search criterion type/value pair, and locating a desired data file, in said memory, by matching said at least one search criterion type/value pair directly against a characteristic of each of said data files, the locating of the desired data file being performed in the absence of requiring a presorting of said data files.

30. The method of claim 29 wherein said search criterion type/value pair is an inode value.

31. The method of claim 29 wherein said locating step uses two search criterion type/value pairs including an inode value in combination with a generation number of said inode value.

32. The method of claim 29 wherein said search criterion type/value pair is a "fileid" file identifier of a MACINTOSH system.

33. The method of claim 29 wherein said search criterion type/value pair is a "dirid" directory identifier of a MACINTOSH system.

* * * * *